US00RE44199E

(19) United States
(12) Reissued Patent
Garodnick

(10) Patent Number: US RE44,199 E
(45) Date of Reissued Patent: May 7, 2013

(54) VARIABLE THROUGHPUT REDUCTION COMMUNICATIONS SYSTEM AND METHOD

(75) Inventor: Joseph Garodnick, Centerville, MA (US)

(73) Assignee: Linex Technologies, Inc., West Long Branch, NJ (US)

(21) Appl. No.: 13/287,620

(22) Filed: Nov. 2, 2011

Related U.S. Patent Documents

Reissue of:

(64) Patent No.: 7,613,247
Issued: Nov. 3, 2009
Appl. No.: 11/113,956
Filed: Apr. 25, 2005

U.S. Applications:

(63) Continuation of application No. 09/946,841, filed on Sep. 6, 2001, now Pat. No. 6,895,037, which is a continuation of application No. 09/594,440, filed on Jun. 14, 2000, now Pat. No. 6,289,039.

(51) Int. Cl.
*H04B 7/02* (2006.01)

(52) U.S. Cl.
USPC ..... 375/267

(58) Field of Classification Search ..... 375/141, 375/144, 145–149, 260, 261, 295, 296, 316, 375/267

See application file for complete search history.

(56) References Cited

U.S. PATENT DOCUMENTS

| | | | | |
|---|---|---|---|---|
| 5,579,304 | A | 11/1996 | Sugimoto et al. | |
| 5,673,286 | A | 9/1997 | Lomp | |
| 5,742,640 | A | 4/1998 | Haoui et al. | |
| 5,926,500 | A | 7/1999 | Odenwalder | |
| 5,995,515 | A * | 11/1999 | Suzuki | 370/465 |
| 6,075,809 | A | 6/2000 | Naruse | |
| 6,192,066 | B1 | 2/2001 | Asanuma | |
| 6,289,039 | B1 | 9/2001 | Garodnick | |
| 6,738,942 | B1 | 5/2004 | Sridharan et al. | |
| 6,747,948 | B1 | 6/2004 | Sarraf et al. | |
| 6,895,037 | B2 | 5/2005 | Garodnick | |
| 2006/0098759 | A1 * | 5/2006 | Tiedemann et al. | 375/297 |
| 2007/0066320 | A1 * | 3/2007 | Padovani et al. | 455/450 |
| 2011/0310996 | A1 * | 12/2011 | Raleigh et al. | 375/295 |

OTHER PUBLICATIONS

Zhong Ye, Gary J. Saulnier, Dennis Lee & Michael J. Medley, A Rate-Adapative Coded OFDM (RA-OFDM) Spread Spectrum System for Tactical Radio Networks, 1999 IEEE, pp. 67-71.

Zhong Ye, Gary J. Saulnier & Michael J. Medley, "Rate Adaptive OFDM (RA-OFDM) Spread Spectrum System for LEO Satellite Communications", 1999 IEEE, pp. 621-625.

* cited by examiner

*Primary Examiner* — Don N Vo

(57) ABSTRACT

A communications system and method having a transmitted data rate determined by an error rate syndrome at a receiver. Data are demultiplexed into a plurality of data channels, and processed as a plurality of channels. A combiner combines the plurality of channels as a multiplexed signal. At a receiver, the multiplexed signal is despread into a plurality of despread channels. A syndrome signal is generated from an error rate of the channels. From the syndrome signal, a desired-data rate is determined for the transmitter.

49 Claims, 7 Drawing Sheets

VARIABLE THROUGHPUT REDUCTION COMMUNICATIONS SYSTEM AND METHOD

Matter enclosed in heavy brackets [ ] appears in the original patent but forms no part of this reissue specification; matter printed in italics indicates the additions made by reissue.

RELATED PATENTS

This patent stems from a continuation application of U.S. patent application Ser. No. 09/946,841, and filing date of Sep. 6, 2001 *now U.S. Pat. No. 6,895,037*, entitled VARIABLE THROUGHPUT REDUCTION SPREAD-SPECTRUM COMMUNICATIONS by inventor, JOSEPH GARODNICK, which issued on May 17, 2005 as U.S. Pat. No. 6,895,037 and which stems from a continuation application of U.S. patent application Ser. No. 09/594,440, and filing date of Jun. 14, 2000, entitled SPREAD-SPECTRUM COMMUNICATIONS UTILIZING VARIABLE THROUGHPUT REDUCTION by inventor, JOSEPH GARODNICK, which issued on Sep. 11, 2001, as U.S. Pat. No. 6,289,039. The benefit of the earlier filing date of the parent patent application is claimed for common subject matter pursuant to 35 U.S.C. § 120.

BACKGROUND OF THE INVENTION

This invention relates to spread-spectrum communications, and more particularly to spread-spectrum communications using parallel channels, preferably employing orthogonal chip-sequence signals, with error rate and data rate feedback.

DESCRIPTION OF THE RELEVANT ART

In a packet-communications spread-spectrum multi-cell system, high-speed data can be implemented with the prior art method of parallel channels, using parallel chip-sequence signals. By using multiple correlators or matched filters, multiple-orthogonal chip-sequence signals can be sent simultaneously thereby increasing the data rate while still enjoying the advantage of a high processing gain. The multiple chip-sequence signals behave as multiple users in a single location. Multipath is ameliorated by a RAKE receiver, and the interference to be overcome by the processing gain is that generated by other users, in the same or adjacent cells. When such interference occurs, it is called a collision.

Normally, when a remote station is within a cell or cell sector, as illustrated in FIG. 1, the path differences from base stations located in the adjacent cells ensure that the interference is small enough so as not to cause the error rate of the wanted signal to deteriorate below a usable level. When the remote station is near the edge of the cell, however, the interference can be substantial as the interference can result from two adjacent cells.

One method that has been used to overcome this problem in a conventional spread-spectrum system is to increase the processing gain in order to increase the immunity from interference. To do this, in a fixed bandwidth system, the data rate is reduced, and the integration time of the correlator or the length of the matched filter is increased accordingly. This method, however, changes the length of the correlator sequence, or changes the size of the matched filter; both of which impact the architecture of the receiver. In addition, with increased integration times, the chip-tracking loop and phase-tracking loop have to function flawlessly and the allowable frequency offset must be reduced, requiring at least a frequency locked loop.

Another method in the prior art is to repeat the symbols sequentially and add the result of the individually received symbols. This method changes the timing of the receiver and the framing of the data at the transmitter.

SUMMARY OF THE INVENTION

A general object of the invention is to vary the throughput of a transmitted spread-spectrum signal.

Another object of the invention is to set the throughput of a transmitted spread-spectrum signal based on a required error rate at a spread-spectrum receiver.

An additional object of the invention is to control a data rate of a spread-spectrum transmitter from a spread-spectrum receiver, using a closed loop method.

According to the present invention, as embodied and broadly described herein, a spread-spectrum system is provided comprising, at a spread-spectrum transmitter, a demultiplexer, a plurality of forward-error-correction (FEC) encoders and interleavers, a plurality of spread-spectrum processors, a combiner, and a modulator. At a spread-spectrum receiver, the system comprises a demodulator, a plurality of spread-spectrum despreaders, a multiplicity of adders, a multiplicity of FEC decoders and de-interleavers, a command processor, and a multiplexer.

The demultiplexer demultiplexes input data into a plurality of data channels. The plurality of forward-error-correction encoders and interleavers FEC encodes and interleaves the plurality of data channels, as a plurality of FEC encoded and interleaved channels, respectively.

The plurality of spread-spectrum processors spread-spectrum processes the plurality of FEC encoded and interleaved channels as a plurality of spread-spectrum channels. The plurality of spread-spectrum channels uses a plurality of chip-sequence signals to define a particular spread-spectrum channel. Preferably, the plurality of chip-sequence signals is a plurality of orthogonal chip-sequence signals, however, a plurality of quasi-orthogonal chip-sequence signals may be used.

The combiner combines the plurality of spread-spectrum channels as a code-division-multiplexed signal. The modulator transmits the code-division-multiplexed signal with the plurality of spread-spectrum channels, over a communications channel.

At the receiver, the demodulator translates the code-division-multiplexed signal to a processing frequency, and the plurality of spread-spectrum despreaders despreads the code-division-multiplexed signal into a plurality of despread channels, respectively.

The multiplicity of adders is electronically controlled by an adder-control signal. The multiplicity of adders adds at least two despread channels to generate a multiplicity of added channels.

The multiplicity of FEC decoder and de-interleavers generates a syndrome signal from an error rate of the multiplicity of added channels. The multiplicity of FEC decoders and de-interleavers, FEC decodes and de-interleaves the multiplicity of added channels, as a multiplicity of decoded channels.

In response to the syndrome signal, the command processor determines a desired-data rate, and generates a data-rate command signal having the desired data rate for the spread-spectrum transmitter. The command processor also generates the adder-control signal for adding together a number of despread channels of the plurality of despread channels, and generates a multiplexer signal having a number of decoded channels to multiplex together. The multiplexer multiplexes the multiplicity of decoded channels to generate an estimate of the input data.

The data-rate command signal is sent to the spread-spectrum transmitter. The data-rate command signal controls into how many data channels the demultiplexer demultiplexes the input data. Assume the demultiplexer, by way of example, demultiplexes input data into 16 parallel channels. If the processor in the receiver determines, as a response to the syndrome, that the input data are to be sent at twice the power of a single data channel of the plurality of data channels, then pairs of data channels in the plurality of data channels have identical data, with a resulting eight sets of data having different data per set. Each set of data comprises two data channels with identical data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
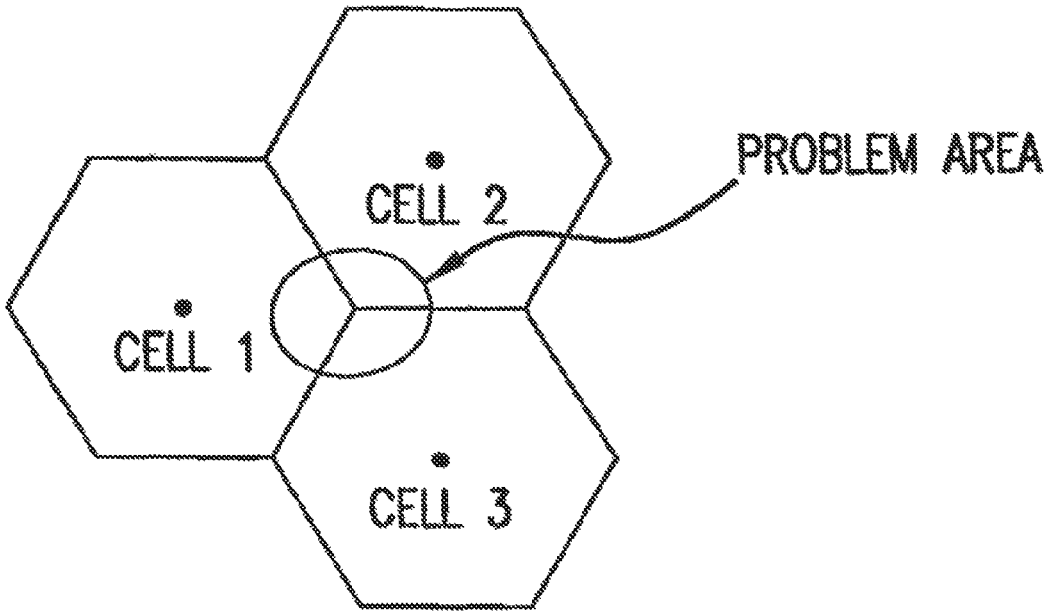
FIG. 1 PRIOR ART
FIG. 1 illustrates a cellular architecture depicting a problem area from a remote station near a boundary.

Reference now is made in detail to the present preferred embodiments of the invention, examples of which are illustrated in the accompanying drawings, wherein like reference numerals indicate like elements throughout the several views.

The present invention employs a command processor with a parallel spread-spectrum system, for determining from an error rate, a desired-data rate. In a preferred embodiment, the desired-data rate meets an error rate criterion, such as fewer errors than a desired error rate. The error rate is from a syndrome, generated in a forward-error-correction decoder.

A spread-spectrum signal, as used herein, typically includes a data signal, multiplied by a chip-sequence signal, and multiplied by a carrier signal. The data signal represents a sequence of data bits. The chip-sequence signal represents a sequence of chips, as normally used in a direct sequence, spread-spectrum signal. The carrier signal is at a carrier frequency, and raises the product of the data signal and the chip-sequence signal, to the carrier frequency.

For synchronization, the data signal typically is a constant value, for example, a series of one bits, or some sequence known a priori, or has very slowly time-varying data. The spread-spectrum signal may be a packet, with a header followed by data, or a plurality of spread-spectrum channels, with one of the spread-spectrum channels used for synchronization. A particular spread-spectrum channel is defined by a particular chip-sequence signal, as is well known in the art. For the case of the packet, synchronization is performed on the header, as is well-known in the art. For a dedicated spread-spectrum channel, synchronization is performed from the dedicated channel.

At a spread-spectrum transmitter, the spread-spectrum system includes demultiplexer means, encoder means, spreader means, combiner means, and modulator means. The encoder means in coupled between the demultiplexer means and the spreader means, and the combiner means is coupled between the spreader means and the modulator means. The input data enters the demultiplexer means.

The demultiplexer means demultiplexes input data into a plurality of data channels. The encoder means FEC encodes and interleaves the plurality of data channels as a plurality of FEC encoded and interleaved channels, respectively. The spreader means spread-spectrum processes the plurality of FEC encoded and interleaved channels as a plurality of spread-spectrum channels. The plurality of spread-spectrum channels has a plurality of chip-sequence signals, respectively. A particular chip-sequence signal defines a particular spread-spectrum channel, as is well-known in the art.

The combiner means combines the plurality of spread-spectrum channels as a spread-spectrum signal. The modulator means transmits the spread-spectrum signal having the plurality of spread-spectrum channels, over a communications channel. A spread-spectrum signal is transmitted over a communications channel by the modulator means.

At a spread-spectrum receiver, the system includes demodulator means, despreader means, adder means, decoder means, command means, and multiplexer means. The despreader means is coupled between the demodulator means and the adder means. The decoder means is coupled between the adder means and the multiplexer means. The command means is coupled to the adder means, decoder means and demultiplexer means. The command means further provides data to a communications link to the spread-spectrum transmitter, and to the demultiplexer means.

The demodulator means translates the code-division-multiplexed signal to a processing frequency. The despreader means despreads the code-division-multiplexed signal into a plurality of despread channels, respectively.

The adder means electronically is controlled by an adder-control signal. The adder means adds none or at least two despread channels to generate a multiplicity of added channels. The decoder means generates a syndrome signal from an error rate of the multiplicity of added channels. The decoder means also FEC decodes and de-interleaves the multiplicity of added channels, and a multiplicity of decoded channels.

In response to the syndrome signal, the command means determines a desired-data rate, and generates a data-rate command signal having the desired data rate. The command means also generates the adder-control signal for controlling the adder means, for adding together a number of despread channels of the plurality of despread channels. The command means generates a multiplexer signal for controlling the multiplexer means. The multiplexer means has a number of decoded channels to multiplex together.

The data-rate command signal is sent to the spread-spectrum transmitter. The data-rate command signal controls the demultiplexer means. The data-rate command signal determines the number of data channels into which input data are demultiplexed. Assume the demultiplexer means can demultiplex input data into a maximum of M data channels, where M is the number of data channels. If the processor means determined from the syndrome, that twice the power were required from the transmitter to maintain or reduce an error rate, then the data-rate command signal controls the multiplexer means to send the input data as two identical sets of M/2 data channels. In general, if the processor means determines from the syndrome, that N times the power is required, then the data-rate command signal controls the multiplexer means to send the input data as N identical sets of M/2 data channels.

The multiplexer means multiplexes the multiplicity of decoded channels and generates an estimate of the input data.

Figure 2:
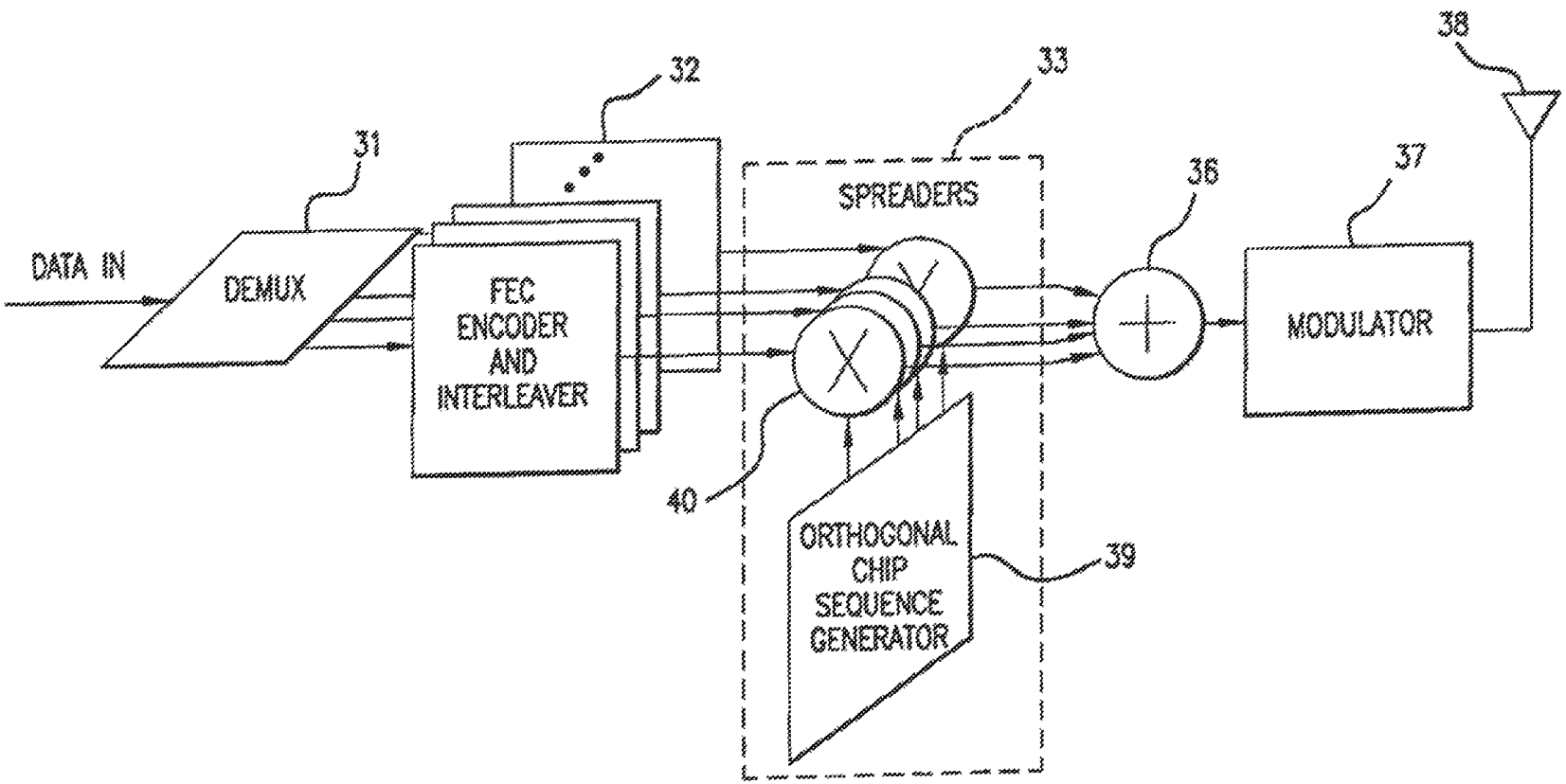
FIG. 2 PRIOR ART
FIG. 2 is a block diagram of a spread-spectrum transmitter using parallel channels.

As illustratively shown in FIG. 2, the demultiplexer means is embodied as a demultiplexer 31, the encoder means in embodied as a plurality of FEC encoders and interleavers 32, and the spreader means is embodied as a plurality of spreaders 33. The combiner means is embodied as a combiner 36, and the modulator means is embodied as a modulator 37. A transmitter antenna is coupled to the modulator 37.

The demultiplexer receives input data. The plurality of FEC encoders and interleavers 32 is coupled between the plurality of outputs from the demultiplexer 31, and the plurality of spreaders 33. The combiner 36 is coupled between the plurality of spreaders 33 and the modulator 37. The plurality of spreaders 33 may include a chip-sequence generator 39 for generating the plurality of orthogonal chip-sequence signals or a plurality of quasi-orthogonal chip-sequence signals, and a plurality of product devices 40, coupled to the chip-sequence generator 39. The plurality of product devices 40 spread-spectrum processes the plurality of encoded channels as the plurality of spread-spectrum channels. The plurality of spreaders, as is well-known in the art, alternatively may be embodied as a plurality of matched filters having a plurality of impulse responses matched to the plurality of chip-sequence signals, or a memory device for storing the plurality of chip-sequence signals.

The demultiplexer 31 demultiplexes input data into a plurality of data channels. The plurality of forward-error-correction encoders and interleavers 32, FEC encode and interleave the plurality of data channels as a plurality of FEC encoded and interleaved channels, respectively. The plurality of spreaders 33 spread-spectrum processes the plurality of FEC encoded and interleaved channels with as a plurality of spread-spectrum channels. The plurality of spread-spectrum channels is defined by a plurality of chip-sequence signals, as is well-known in the art.

The combiner 36 combines the plurality of spread-spectrum channels as a code-division-multiplexed signal, and the modulator 37 transmits, through the transmitter antenna 38, the code-division-multiplexed signal with the plurality of spread-spectrum channels, over a communications channel.

Figure 3:
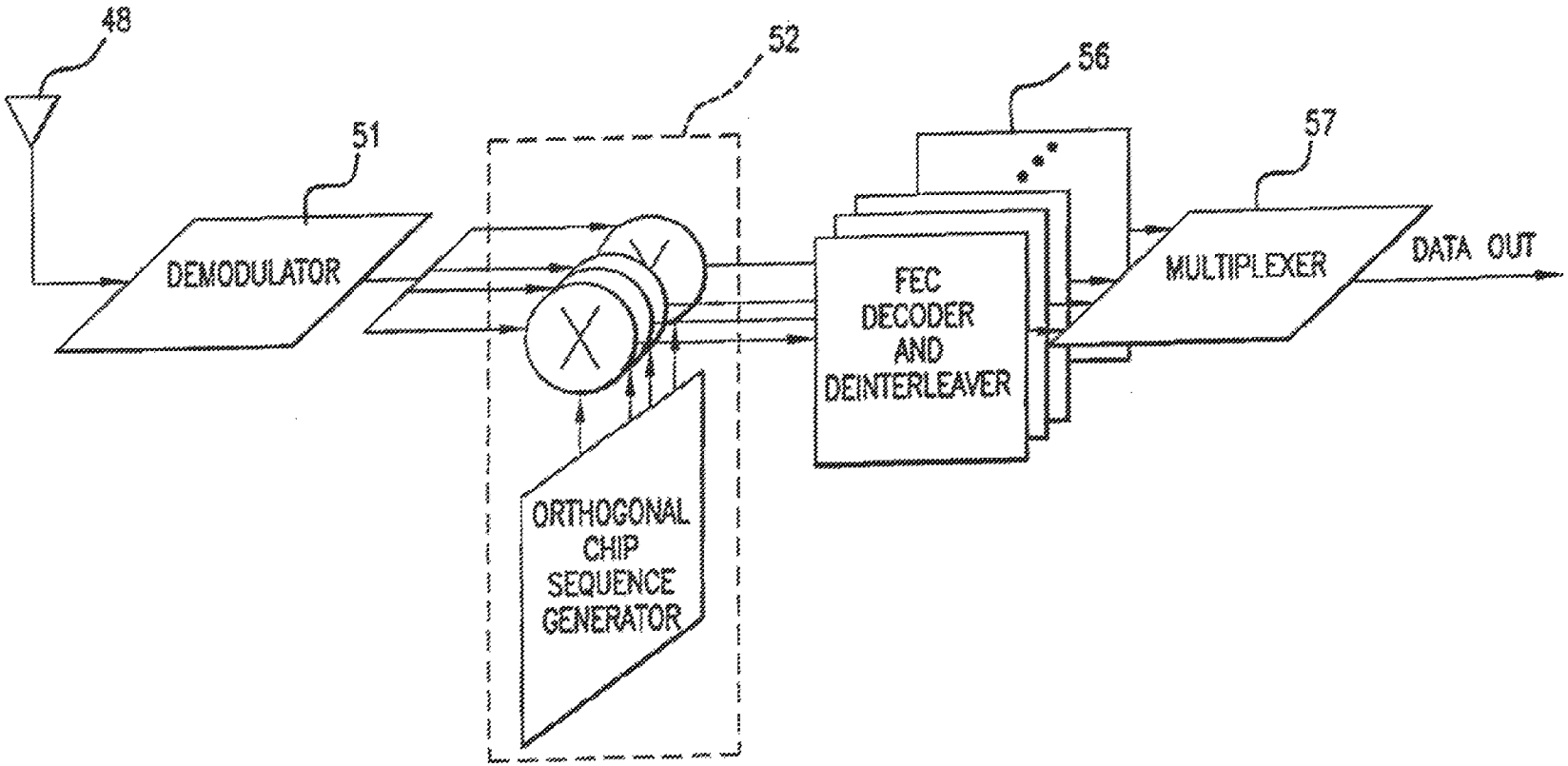
FIG. 3 PRIOR ART
FIG. 3 is a block diagram of a spread-spectrum receiver for receiving parallel channels.

In the exemplary arrangement shown in FIG. 3, the demodulator means is embodied as a demodulator 51, and the despreader means is embodied as a plurality of despreaders 52. The adder means is embodied as a multiplicity of adders 53. The decoder means is embodied as a plurality of FEC decoders and de-interleavers 56, and the demultiplexer means is embodied as a demultiplexer 31.

The demodulator 51 is coupled to the communications channel through antenna 48. The plurality of despreaders 52 is coupled between the demodulator 51 and the plurality of FEC decoders and de-interleavers 56. The plurality of FEC decoders and de-interleavers 56 is coupled between the multiplicity of adders 53 and the multiplexer 57.

The demodulator 51 translates the code-division-multiplexed signal to a processing frequency. The plurality of despreaders 52 despreads the code-division-multiplexed signal into a plurality of despread channels, respectively. The plurality of despreaders 52 may be embodied, as is well-known in the art, as a plurality of matched filters or a plurality of correlators.

The multiplicity of FEC decoder and de-interleavers 56 generates a syndrome signal from an error rate of the multiplicity of added channels, and FEC decodes and de-interleaves the multiplicity of added channels, as a multiplicity of decoded channels. The multiplexer 57 multiplexes the multiplicity of decoded channels and generates an estimate of the input data.

The prior art spread-spectrum transmitter and receiver, as shown in FIGS. 2 and 3, use parallel chip-sequence signals. The data to be transmitted are first de-multiplexed by a demultiplexer 31 to produce a plurality of uncorrelated data channels. Each uncorrelated data channel has at a lower data rate than the original data rate of data entering the demultiplexer 31. For example, if the incoming data rate were 16 megabits per second (Mbps), and the incoming data were de-multiplexed to 16 data channels, with each data channel at one Mbps.

The plurality of data channels is forward error correction (FEC) encoded and interleaved by a plurality of FEC encoders and interleavers 32, respectively, to generate a plurality of FEC encoded and interleaved data channels. FEC encoders and interleavers are well-known to the ordinary skilled artisan, and found in many technical journal articles and textbooks.

A plurality of spreaders 33 spread-spectrum processes the plurality of FEC encoded and interleaved data channels, as a plurality of spread-spectrum channels. A spreader typically is a product device for multiplying a data-sequence signal by a chip-sequence signal. A de-spreader equivalently may be realized from a matched filer or SAW device, as is well-known in that art.

In FIG. 2, the plurality of spreaders 33 includes a chip-sequence generator 34 for generating a plurality of chip-sequence signals and a plurality of product devices 35. In a preferred embodiment, the plurality of chip-sequence signals is a plurality of orthogonal chip-sequence signals, although a plurality of quasi-orthogonal chip-signal sequence signals also could be used. By quasi-orthogonal chip-sequence signals is meant chip-sequence signals which are nearly orthogonal or which are not orthogonal but have orthogonal type qualities.

The plurality of product devices 35 is coupled to the chip-sequence generator 34, and to the plurality of encoders and interleavers 32, respectively. The plurality of product devices 35 spread-spectrum processes the plurality of FEC encoded and interleaved data channels, as a plurality of spread-spectrum channels. A product device my be embodied as an AND gate, or equivalently from one or more combinations of AND gates, NAND gates, NOR gates, gates or EXCLUSIVE-OR (XOR) gates. An alternative for the plurality of spreaders 33 is a plurality of matched filters or a plurality of surface acoustic wave devices, each having an impulse response matched to one of the chip-sequence signals in the plurality of chip-sequence signals.

The outputs of the plurality of spreaders 33 are combined by a combiner 36 and sent to the modulator 37 and transmitted over a communications channel. The combiner 36 preferably linearly combines the plurality of spread-spectrum channels, as a code-division-multiplexed signal having a multiplicity of channels. The combiner 36 alternatively may non-linearly combine the plurality of spread-spectrum channels, in some applications. The multiplicity of channels is defined by a respective chip-sequence signal, used for a spread-spectrum channel in the plurality of spread-spectrum channels, as is well-known in the art. The spreaders can operate at a chip rate depending on the desired processing gain.

In the spread-spectrum receiver, the process is reversed. Initially, a received code-division-multiplexed signal is amplified, filtered and shifted to baseband frequence by a demodulator 51. The received code-division-multiplexed signal is then despread by a plurality of de-spreaders 52. The plurality of despreaders 52 may be embodied as a plurality of correlators or a plurality of matched filters. A plurality of surface acoustic wave (SAW) devices alternatively may be used. The outputs of the plurality of de-spreaders are decoded and de-interleaved by a plurality of FEC decoders and de-interleavers 56, to produce a plurality of sub-channels of data. The plurality of sub-channels of data is multiplexed by a multiplexer 57 to generate a replica of the input data.

Figure 4:
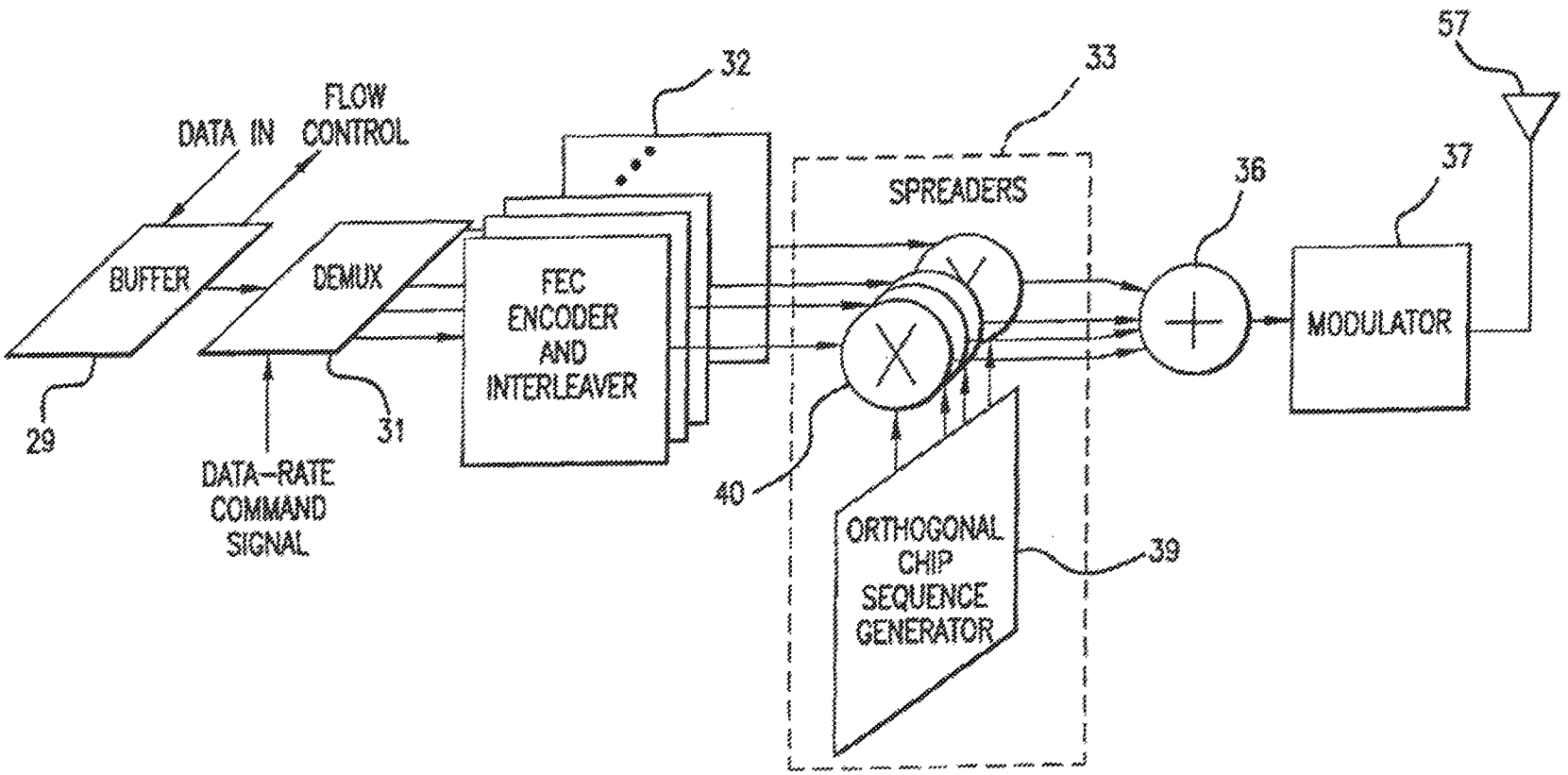
FIG. 4 is a block diagram of a spread-spectrum transmitter having a data buffer, and a demultiplexer controlled by a data-rate command signal, and using parallel channels.

The modification to FIG. 2, shown in FIG. 4, includes having a data-rate command signal control the demultiplexer 31. Input data to the demultiplexer 31, initially may pass through a buffer 29. The data-rate command signal controls the data rate of data from the demultiplexer 31. More particularly, the data-rate command signal determines the number of data channels having identical data and different data, in the plurality of data channels from demultiplexer 31.

Figure 5:
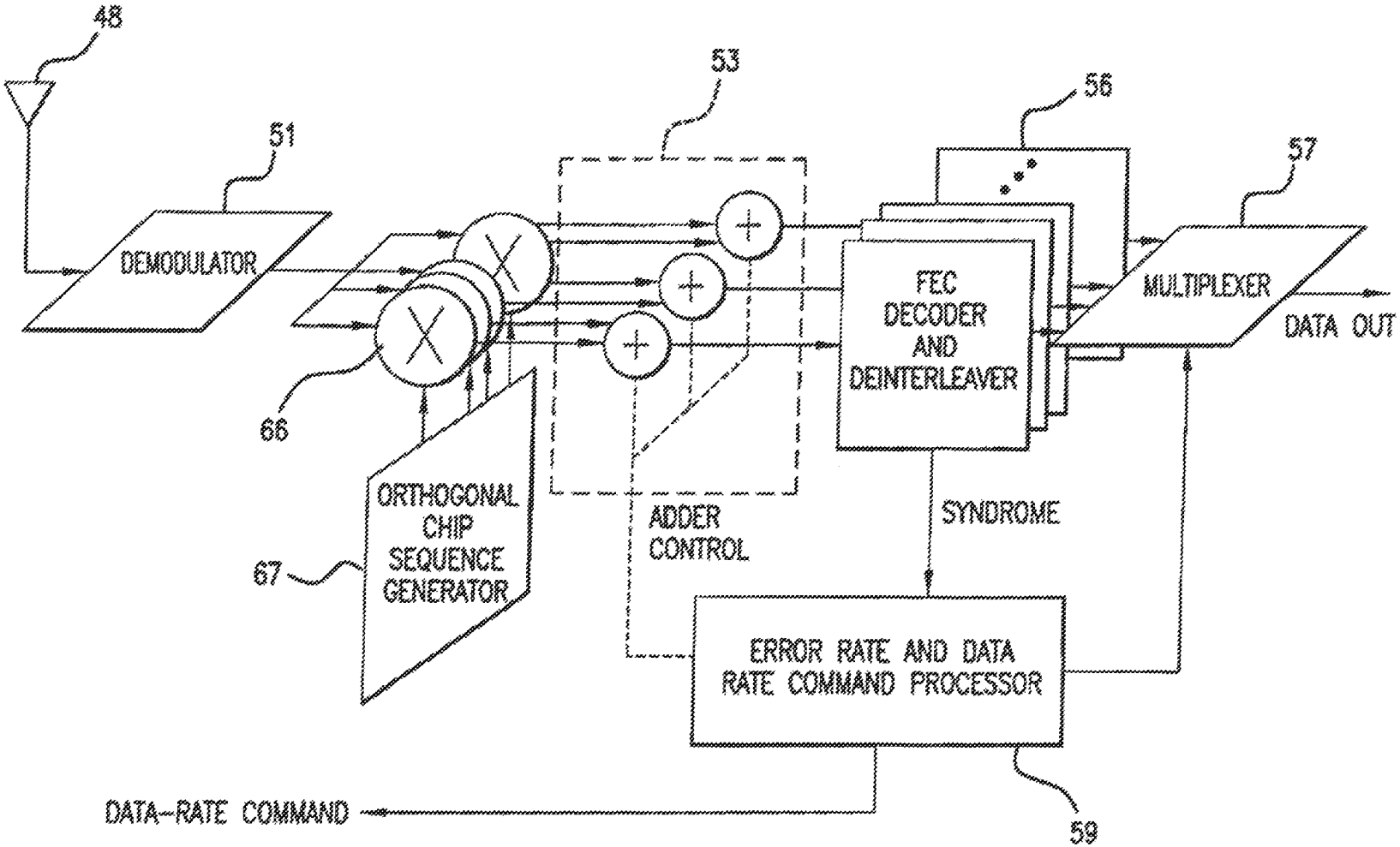
FIG. 5 is a block diagram of a spread-spectrum receiver for receiving parallel channels, with an error rate and a data rate command processor.

In the exemplary arrangement shown in FIG. 5, the command means, embodied as a command processor 59, and adder means embodied as a multiplicity of adders 53, is added to the embodiment shown in FIG. 3. The multiplicity of adders 53 is coupled between the plurality of despreaders 52 and the plurality of FEC decoders and de-interleavers 56, respectively. The command processor 59 is coupled to the plurality of FEC decoders and de-interleavers 56, the multiplexer 57, and the multiplicity of adders 53. The command processor 59 has a communications link to the spread-spectrum traqnsmitter, for sending the data-rate command signal to the spread-spectrum transmitter.

The multiplicity of FEC decoders generates a syndrome signal from an error rate of the multiplicity of added channels. In response to the syndrome signal, the command processor 59 determines a desired-data rate, and generates a data-rate command signal having the desired data rate. The command processor 59 also generates the adder-control signal, used by the multiplicity of adders 53, for adding together a number of despread channels of the plurality of despread channels. The command processor 59 generates a multiplexer signal having a number of decoded channels to multiplex together. The multiplexer 57, in response to the multiplexer signal, sets the number of the multiplicity of decoded channels to be multiplexed. The multiplexer 57 multiplexes the multiplicity of decoded channels and generates an estimate of the input data.

As illustratively shown in FIG. 4, the input data rate to the transmitter is reduced by a data-rate command signal, which is transmitted from the spread-spectrum receiver. The data rate can be reduced by any factor of the width of the demultiplexer 31. For example, if 16 parallel chip-sequence signals were used, then the input data rate can be reduced by a factor between 2 and 16. In a system, a buffer 29 and flow control may be required. The demultiplexer 31 then outputs identical bits to multiple lines that are fed to the encoders and interleavers 32. For example, the data rate command may be to reduce the data rate by a factor of 2. If 16 parallel chip-sequence signals were used, two spreaders would be devoted to each bit; that is, the transmitted power for each bit would be twice the power than in the maximum data rate situation.

In the exemplary arrangement shown in FIG. 5, the remote receiver further includes command processor 59. The error-rate and data rate command processor 59 reads or is fed the syndrome from the plurality of FEC decoders and de-interleavers 56. In response to the syndrome, the command processor 59 determines a data rate. Thus, the data rate is dependent on the error rate of data being received and decoded by the plurality of FEC decoders. The command processor 59, based on the data rate determined by the command processor 59, generates the data-rate command signal, the adder-control signal, and the multiplexer-control signal. The command processor 59 generates the data-rate command signal shown in FIG. 4.

The receiver shown in FIG. 5 is configured, by way of example, for a data rate reduction by a factor of two. The outputs of every two matched filters are added together before the data sub-streams are decoded and de-interleaved. The add-control signal is generated by the command processor 59. The multiplexer 57 then selects only half the decoder outputs, i.e., half of the plurality of decoded channels, to combine to form the output data. By way example, the syndrome of the FEC decoder is used to measure the error rate. The error rate information is used to generate the data rate command, which is transmitted to the base station transmitter. The error rate processor also controls the multiplexer 57 and the adders 53 as it determines how many of the outputs from the plurality of despreaders 52 should be combined for the reduced error rate.

Figure 6:
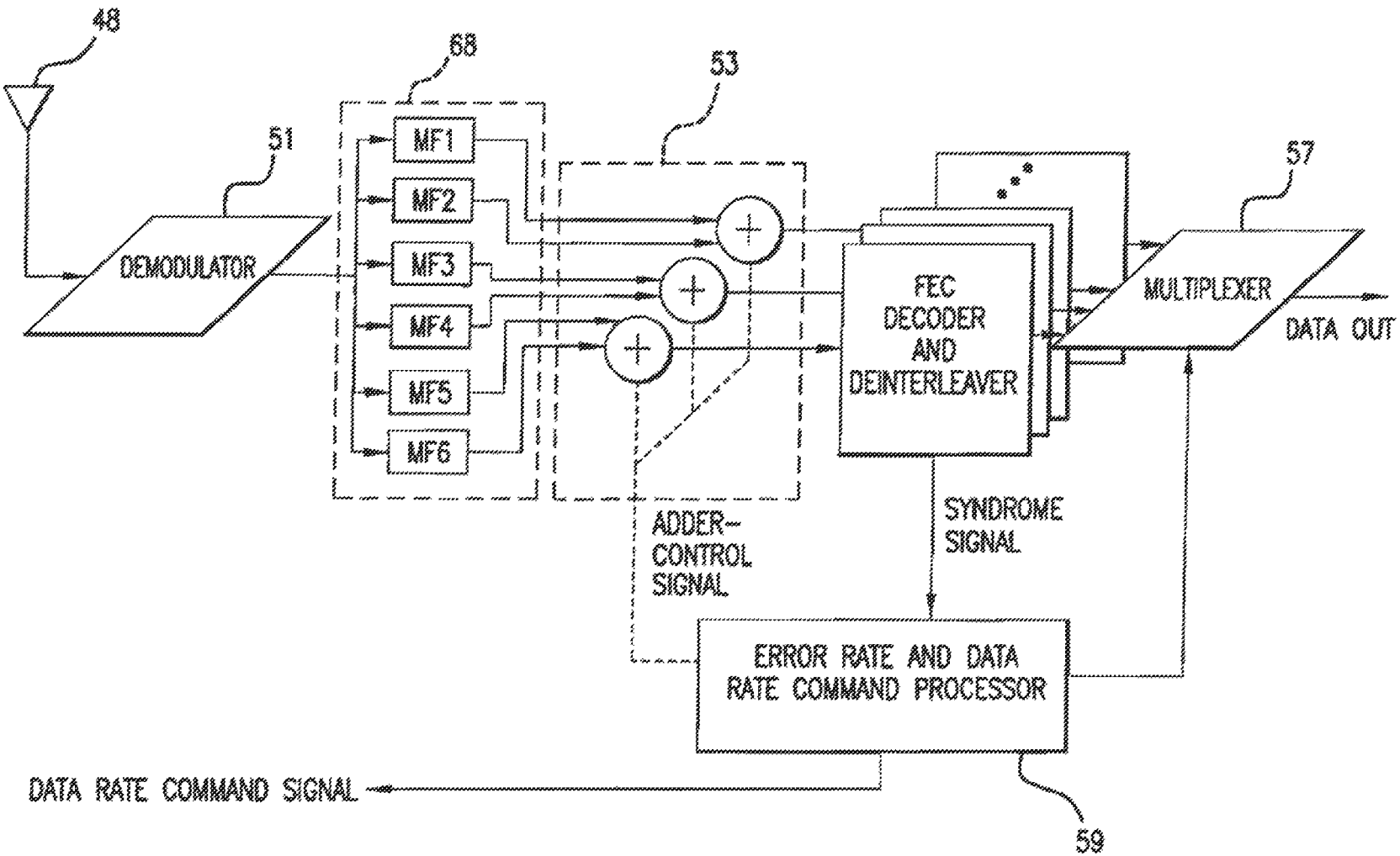
FIG. 6 is a block diagram of a spread-spectrum receiver for receiving parallel channels, using matched filter or SAW technology, with an error rate and a data rate command processor.

FIG. 6 shows the despreaders 52 alternatively embodied as a plurality of matched filters 67. Equivalently, the plurality of despreaders may be embodied as a plurality of SAW devices, which mathematically are equivalent to a plurality of matched filters 67.

Figure 7:
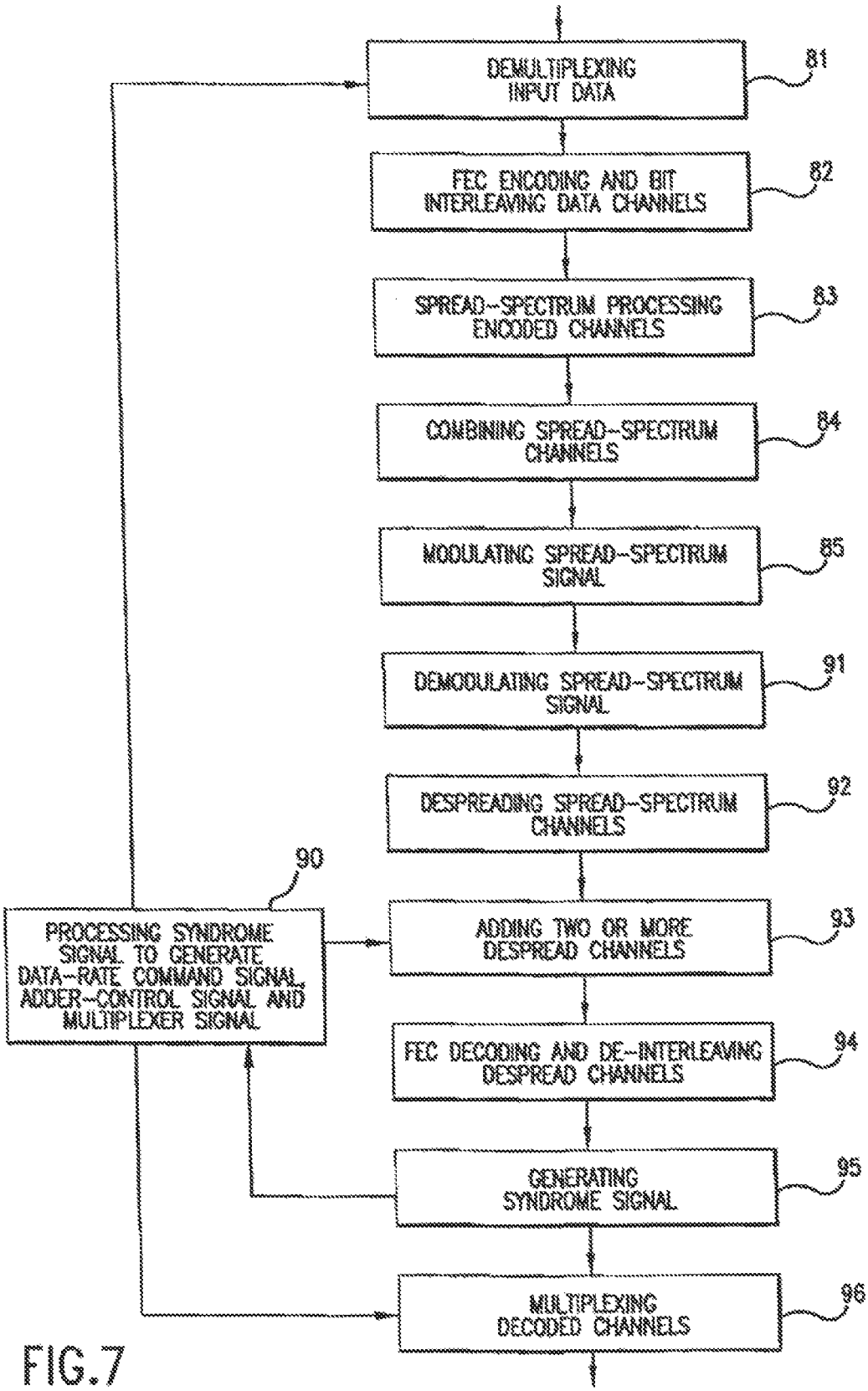
FIG. 7 is a flow chart of controlling data rate of a spread-spectrum transmitter, based on error rate at a spread-spectrum receiver.

As illustratively shown in FIG. 7, the present invention also includes a spread-spectrum method for controlling the data rate at a spread-spectrum transmitter. The method includes the steps of demultiplexing 81, in response to a data-rate command signal, input data into a plurality of data channels. The number of data channels in the plurality of data channels is determined from the data rate command signal.

The method includes FEC encoding and interleaving 82 the plurality of data channels as a plurality of FEC encoded and interleaved channels, respectively; and spread-spectrum processing 83 the plurality of FEC encoded and interleaved channels as a plurality of spread-spectrum channels. The plurality of spread-spectrum channels preferably are embodied with a plurality of orthogonal or quasi-orthogonal chip-sequence signals.

The method further includes the steps of combining 84 the plurality of spread-spectrum channels as a code-division-multiplexed signal; and modulating 85 and transmitting the code-division-multiplexed signal, which has the plurality of spread-spectrum channels, over a communications channel.

At a spread-spectrum receiver, the method includes the steps of demodulating 85 or translating the code-division-multiplexed signal to a processing frequency; despreading 92 the code-division-multiplexed signal into a plurality of despread channels, respectively; and adding 93, based on an adder-control signal, at least two despread channels to generate a multiplicity of added channels. The method includes generating 95 a syndrome signal from an error rate of the multiplicity of added channels; FEC decoding and de-interleaving 94 the multiplicity of added channels, and a multiplicity of decoded channels; and, determining 90, in response to the syndrome signal, a desired-data rate. The method further includes generating 90 a data-rate command signal having the desired data rate; generating, in response to the syndrome signal, the adder-control signal for adding together a number of despread channels of the plurality of despread channels; generating 90, in response to the syndrome signal, a multiplexer signal having a number of decoded channels to multiplex together; and multiplexing 96 the multiplicity of decoded channels and an estimate of the input data. The data-rate command signal is sent over a communications channel to the spread-spectrum transmitter.

It will be apparent to those skilled in the art that various modifications can be made to the spread-spectrum communications, variable throughput reduction system and method of the instant invention without departing from the scope or spirit of the invention, and it is intended that the present invention cover modifications and variations of the spread-spectrum communications, variable throughput reduction system and method provided they come within the scope of the appended claims and their equivalents.

I claim:

1. A communications system comprising a transmitter, including, a demultiplexer for demultiplexing input data into a plurality of data channels;

a plurality of forward-error-correction encoders and interleavers, coupled to said demultiplexer, for FEC encoding and interleaving the plurality of data channels as a plurality of FEC encoded and interleaved channels, respectively;

a plurality of processors coupled to said plurality of FEC encoders and interleavers, for processing the plurality of FEC encoded and interleaved channels as a plurality of modulated channels;

a combiner coupled to said plurality of processors, for combining the plurality of modulated channels as a multiplexed signal;

a receiver, including, a plurality of demodulators for demodulating the multiplexed signal into a plurality of demodulated channels, respectively;

a multiplicity of FEC decoder and de-interleavers, coupled to said plurality of demodulators for FEC decoding and de-interleaving the multiplicity of demodulated channels, as a multiplicity of decoded demodulated channels having an error rate;

a command processor responsive to the error rate for determining a desired data rate and generating a control signal to be transmitted to the transmitter; and a multiplexer, coupled to said plurality of FEC decoders and de-interleavers, for multiplexing the multiplicity of decoded channels

*said transmitter including receiver circuitry for receiving the control signal transmitted by the receiver and circuitry responsive to the control signal to control the data rate of transmitted data.*

2. The communications system as set forth in claim 1, wherein said multiplicity of FEC decoders generates a plurality of syndrome signals; and said command processor is responsive to the plurality of syndrome signals, for determining which channels in the plurality of modulated channels to delete from transmission over the communications channel.

3. The communications system as set forth in claim 1, wherein said multiplicity of FEC decoders generates a plurality of syndrome signals; and a said command processor is responsive to the plurality of syndrome signals, for employing erasure decoding for correcting errors.

4. The communications system as set forth in claims 1 wherein said command processor is responsive to the a plurality of syndrome signals for sending a data-rate command signal to the transmitter.

5. A communications system comprising:

a transmitter, including, demultiplexer means for demultiplexing input data into a plurality of data channels;

encoder means far FEC encoding and interleaving the plurality of data channels as a plurality of FEC encoded and interleaved channels, respectively;

processor means for processing the plurality of FEC encoded and interleaved channels as a plurality of modulated channels;

combiner means for combining the plurality of modulated channels as a multiplexed signal;

a receiver, including, demodulator means for demodulating the multiplexed signal into a plurality of demodulated channels, respectively;

decoder means for FEC decoding and de-interleaving the multiplicity of demodulated channels, as a multiplicity of decoded channels having an error rate;

command processor means responsive to the error rate for generating a signal indicating a desired data rate to be sent to said transmitter; and multiplexer means for multiplexing the multiplicity of decoded channels

*said transmitter including receiver circuitry for receiving the control signal transmitted by the receiver and circuitry responsive to the control signal to control the data rate of transmitted data.*

6. The communications system as set forth in claim 5, wherein said decoder means generates a plurality of syndrome signals; and said command processor is responsive to the plurality of syndrome signals for determining which channels in the plurality of modulated channels to delete from transmission over the communications channel.

7. The communications system as set forth in claim 5, wherein said decoder means generates a plurality of syndrome signals; and said command processor means is responsive to the plurality of syndrome signals, for employing erasure decoding for correcting errors.

8. A communications method comprising the steps of:

demultiplexing input data into a plurality of data channels;

FEC encoding and interleaving the plurality of data channels as a plurality of FEC encoded and interleaved channels, respectively;

processing the plurality of FEC encoded and interleaved channels as a plurality of modulated channels;

combining the plurality of channels as a multiplexed signal;

transmitting the multiplexed signal having the plurality of modulated channels, over a communications channel;

demodulating the multiplexed signal into a plurality of demodulated channels, respectively;

FEC decoding and de-interleaving the plurality of demodulated channels, as a multiplicity of decoded channels;

generating a syndrome signal from an error rate of the multiplicity of decoded channels;

generating, in response to the syndrome signal, a channel quality [indication] *control* signal indicating a desired data rate;

transmitting the quality [indication] *control* signal to the transmitter; [and]

multiplexing the multiplicity of decoded channels*; and*

*controlling the data rate of data transmitted during said transmitting step in response to the control signal.*

9. The communications method as set forth in claim 8, further including the steps of:

generating a plurality of syndrome signals; and determining, responsive to the plurality of syndrome signals, which channels in the plurality of modulated channels to delete from transmission over the communications channel.

10. The communications method as set forth in claim 8, further including the steps of:

generating a plurality of syndrome signals; and employing, responsive to the plurality of syndrome signals, erasure decoding for correcting errors.

*11. A receiver for recovering wireless data conveyed in data symbols by a plurality of different subchannel signals transmitted over a wireless channel, comprising:*

*demodulator circuitry for detecting the transmitted signals in a plurality of demodulated channels;*

*decoder circuitry for FEC decoding and de-interleaving the plurality of demodulated channels, providing a multiplicity of decoded channels, each having an error rate;*

*command processor circuitry responsive to the error rate of the decoded channels for generating a data-rate control signal to produce a desired data rate to be sent by the data symbol transmitter of the signals, the data rate control signal controlling operation of circuitry at the transmitter to produce the desired data rate to be sent by the data symbol transmitter of the signals;*

*transmitting circuitry for conveying the error rate dependent rate control signal back to the data symbol transmitter; and*

*multiplexer circuitry for combining the multiplicity of decoded channels into a signal stream of received data.*

*12. The receiver of claim 11 wherein the decoder circuitry includes circuitry to decode FEC codes of different rates.*

*13. A method for recovering wireless data conveyed in data symbols by a plurality of different subchannel signals transmitted over a wireless channel, comprising the steps of:*

*detecting the transmitted signals in a plurality of demodulated channels;*

*FEC decoding and de-interleaving the plurality of demodulated channels, providing a multiplicity of decoded channels, each having an error rate;*

*using command processor circuitry responsive to the error rate of the decoded channels to generate a data-rate control signal to produce a desired data rate to be sent by the data symbol transmitter of the signals,*

*transmitting the error rate dependent data-rate control signal back to the data symbol transmitter; and*

*multiplexing the multiplicity of decoded channels into a single stream of received data.*

*14. The method of claim 13 wherein the decoding step includes decoding FEC codes of different rates.*

*15. A transmitter for generating a wireless signal forming transmitted signals having a data rate including*

*a demultiplexer for demultiplexing input data into a plurality of independent data channels;*

*encoder circuitry for FEC encoding and interleaving the plurality of data channels as a plurality of FEC encoded and interleaved channels, respectively;*

*processor circuitry for processing the plurality of FEC encoded and interleaved channels as a plurality of modulated channels;*

*a receiver, located at the transmitter, for receiving a data-rate control signal generated from a remote terminal; and*

*a processor responsive to the data-rate control signal for adjusting the data rate of the transmitted signals.*

*16. The transmitter of claim 15 wherein the FEC encoder circuitry is set to different code rates.*

*17. The transmitter of claim 16 wherein the data rate processor changes the transmitted data rate by changing the FEC encoding rate.*

*18. A method tor transmitting a wireless signal forming transmitted signals having a data rate, including the steps of*

*demultiplexing input data into a plurality of independent data channels;*

*FEC encoding and interleaving the plurality of data channels as a plurality of FEC encoded and interleaved channels, respectively;*

*processing the plurality of FEC encoded and interleaved channels as a plurality of modulated channels;*

*receiving an error rate dependent data rate control signal generated from a remote terminal; and*

*adjusting the data rate of the transmitted signal in accordance with the data-rate control signal.*

*19. The method of claim 18 wherein the modulated channels are set to common symbol rates but different modulated depths.*

*20. The method of claim 18 wherein the FEC encoding is set to varying code rates.*

*21. The method of claim 18 wherein the data rate processor changes the transmitted data rate by changing the FEC encoding rate.*

*22. A wireless transmitter comprising:*

*a demultiplexer having at least one input and a plurality of outputs, said input receiving an input data stream and said outputs providing a first plurality of parallel output data streams, with each output data stream including a group of different data symbols from said input data stream, said output data streams collectively providing a first data rate;*

*a spread spectrum processor for generating a separate spread spectrum signal for each of said first plurality of output data streams;*

*transmission circuitry for simultaneously transmitting said separate spread spectrum signals in a common channel; and*

*a controller for said demultiplexer, said controller receiving a feedback control signal from a receiver, said feedback control signal being an indication of the signal quality of the data rate received at the receiver, whereby in response to said feedback control signal indicating a reduction in signal quality, said controller controls said demultiplexer to change said outputs from output data streams having different data symbols to output data streams having the same data symbols, thereby providing a second data rate lower than said first data rate.*

*23. The wireless transmitter of claim 22 further including FEC encoder circuitry for FEC-encoding said first plurality of parallel output data streams.*

*24. The wireless transmitter of claim 23 further including bit-interleaving circuitry for bit-interleaving said first plurality of FEC-encoded parallel output data streams.*

*25. The wireless transmitter of claim 22 wherein said demultiplexer has additional outputs which provide a second plurality of parallel output data streams accompanying said first plurality of parallel output data streams, each respective one of said second plurality of output data streams including the same data symbols as a respective one of said first plurality of parallel output data streams.*

*26. The transmitter of claim 22 wherein said feedback control signal is a data rate command signal.*

*27. A wireless transmitter comprising:*

*a demultiplexer having at least one input and a plurality of outputs, said input receiving an input data stream and said outputs providing a first plurality of parallel output data streams with each output data stream including a group of different data symbols from said input data stream, said output data streams collectively providing a first data rate;*

*a spread spectrum processor for generating a separate spread spectrum signal for each of said first plurality of output data streams;*

*transmission circuitry for simultaneously transmitting said separate spread spectrum signals in a common channel; and*

*a controller for said demultiplexer, said controller receiving a feedback control signal from a receiver, said feedback control signal being an indication of the signal quality of the data received at the receiver whereby, in response to said feedback control signal indicating a reduction in signal quality, said controller controls said demultiplexer to change said outputs from said first plurality of output data streams having different data symbols to a second plurality of output data streams having different data symbols, said second plurality being less than said first plurality, whereby said second plurality of output data streams collectively provides a second data rate lower than said first data rate.*

*28. The wireless transmitter of claim 27 further including FEC encoder circuitry for FEC-encoding said first and second plurality of parallel output data streams.*

*29. The wireless transmitter of claim 28 further including bit-interleaving circuitry for bit-interleaving said first and second plurality of FEC-encoded parallel output data streams.*

*30. The wireless transmitter of claim 27 wherein said demultiplexer additionally produces a third plurality of parallel output data streams, each respective one of said third plurality of output data streams including the same data symbols as a respective one of said first plurality of parallel output data streams.*

*31. The wireless transmitter of claim 27 wherein said demultiplexer additionally produces a fourth plurality of parallel output data streams, each respective one of said fourth plurality of output data streams including the same data symbols as a respective one of said second plurality of parallel output data streams.*

*32. The transmitter of claim 27 wherein said feedback control signal is a data rate command signal.*

*33. A wireless transmitter that transmits an input bit stream by demultiplexing the input bit stream to form plural, parallel, lower-rate output bit streams which, after processing are simultaneously transmitted in separately detectible signals within a common frequency channel, comprising:*

*a demultiplexer for demultiplexing said input bit stream and producing parallel, lower-rate output bit streams, each lower-rate output bit stream having a group of different symbols from said input bit stream; and*

*control circuitry for said demultiplexer responsive to a feedback control signal from a receiver, said feedback control signal being an indication of the signal quality of data received at the receiver, said control circuitry causing the number of said parallel, lower-rate output bit streams produced by said demultiplexer to increase when said feedback control signal indicates an increase in signal quality and to decrease when said feedback signal indicates a decrease in signal quality.*

*34. The wireless transmitter of claim 33 wherein said parallel, lower-rate output bit streams are transmitted as signals having constant symbol durations.*

*35. The wireless transmitter of claim 34 wherein said parallel, lower-rate output bit streams are error-encoded and bit-interleaved before transmission.*

*36. The wireless transmitter of claim 33 wherein said parallel, lower-rate output bit streams collectively have a data rate that increases when the number of said lower-rate output bit streams increases and have a data rate that decreases when the number of said lower-rate output bit streams decreases.*

*37. The transmitter of claim 33 wherein said feedback control signal is a data rate command signal.*

*38. A wireless receiver for simultaneously receiving a plurality of spread spectrum signals transmitted in a common frequency channel, comprising:*

*rf circuitry for converting said received spread spectrum signals to baseband;*

*a demodulator for separating said baseband spread spectrum signals and for recovering a stream of data symbols from each of said spread spectrum signals;*

*a multiplexer for multiplexing bit-streams of data derived from said recovered streams of data symbols to form a single stream of output data; and*

*a controller for controlling the number of bit-streams that are applied to said multiplexer, whereby the rate of said single stream of output data is determined by the number of bit-streams applied to said multiplexer.*

*39. The receiver of claim 38 further including a bit-deinterleaver and FEC decoder for deinterleaving and decoding said bit-streams before they are applied to the multiplexer.*

*40. The receiver of claim 38 wherein said controller combines bit-streams having the same bit sequences to produce said bit-streams applied to said multiplexer.*

*41. The receiver of claim 38 wherein said controller generates a feedback control signal which is sent to the transmitter that transmits said plurality of spread spectrum signals, said feedback control signal indicating the signal quality of the data received at the receiver, said feedback control signal changing the number of transmitted spread spectrum signals that have different bit sequences, whereupon said controller changes the number of bit-streams that are applied to said multiplexer to change the rate of said single stream of output data.*

*42. The receiver of claim 41 wherein said controller increases the number of inputs applied to said multiplexer when said feedback control signal indicates an increase in signal quality.*

*43. The receiver of claim 41 wherein said controller decreases the number of inputs applied to said multiplexer when said feedback signal indicates a decrease in signal quality.*

*44. A receiver for simultaneously receiving a plurality of separately-detectible signals simultaneously transmitted in a common frequency channel, comprising:*

*rf circuitry for converting said received plurality of signals to baseband;*

*a demodulator for separating said plurality of baseband signals and for recovering a stream of data symbols from each of said signals;*

*a multiplexer for multiplexing bit-streams of data derived from said recovered streams of data symbols to form a single stream of output data; and*

*a controller for controlling the number of bit-streams that are applied to said multiplexer, whereby the rate of said single stream of output data is determined by the number of bit-streams applied to said multiplexer.*

*45. The receiver of claim 44 further including a bit-deinterleaver and an FEC decoder for deinterleaving and decoding said bit-streams before they are applied to said multiplexer.*

*46. The receiver of claim 44 wherein said controller combines bit-streams having the same bit sequences to produce said bit-streams applied to said multiplexer.*

*47. The receiver of claim 44 wherein said controller generates a feedback control signal which is sent to the transmitter that transmits said plurality of signals, said feedback control signal indicating the signal quality in the channel between the transmitter and said receiver, said feedback control signal changing the number of transmitted separately-detectible signals that have different bit sequences, whereupon said controller changes the number of bit-streams that are applied to said multiplexer to change the rate of said single stream of output data.*

*48. The receiver of claim 47 wherein said controller increases the number of inputs applied to said multiplexer when said feedback signal indicates an increase in signal quality.*

*49. The receiver of claim 47 wherein said controller decreases the number of inputs applied to said multiplexer when said feedback signal indicates a decrease in signal quality.*

* * * * *